US009329667B2

(12) United States Patent
Banerjee (10) Patent No.: US 9,329,667 B2
(45) Date of Patent: May 3, 2016

(54) COMPUTING DEVICE EMPLOYING A PROXY PROCESSOR TO LEARN RECEIVED PATTERNS

(71) Applicant: COMPLETECOVER, LLC, San Jose, CA (US)

(72) Inventor: Kaberi Banerjee, San Jose, CA (US)

(73) Assignee: COMPLETECOVER, LLC, San Jose, CA (US)

( * ) Notice: Subject to any disclaimer, the term of this patent is extended or adjusted under 35 U.S.C. 154(b) by 394 days.

(21) Appl. No.: 13/870,102

(22) Filed: Apr. 25, 2013

(65) Prior Publication Data

US 2014/0143569 A1    May 22, 2014

Related U.S. Application Data

(60) Provisional application No. 61/729,103, filed on Nov. 21, 2012.

(51) Int. Cl.
*G06F 1/32* (2006.01)

(52) U.S. Cl.
CPC ............ *G06F 1/3287* (2013.01); *G06F 1/3293* (2013.01); *Y02B 60/121* (2013.01); *Y02B 60/1282* (2013.01)

(58) Field of Classification Search
CPC .... G06F 1/3243; G06F 1/3287; G06F 1/3293
USPC .................................................. 713/320, 323
See application file for complete search history.

(56) References Cited

U.S. PATENT DOCUMENTS

| | | | |
|---|---|---|---|
| 6,351,823 B1 * | 2/2002 | Mayer ................... | G06F 1/3203 709/208 |
| 7,873,849 B2 | 1/2011 | Mucignat et al. | |
| 2004/0196152 A1 * | 10/2004 | Tice ........................ | G08B 25/10 340/539.26 |
| 2005/0143954 A1 * | 6/2005 | Takeda ............... | G08B 13/2491 702/183 |
| 2007/0161861 A1 * | 7/2007 | Kawai et al. ................... | 600/145 |
| 2007/0241261 A1 * | 10/2007 | Wendt ............................ | 250/221 |
| 2007/0245164 A1 * | 10/2007 | Mitarai ......................... | 713/320 |
| 2008/0174550 A1 * | 7/2008 | Laurila .................... | A63F 13/02 345/158 |
| 2008/0234935 A1 | 9/2008 | Wolf et al. | |
| 2009/0027195 A1 * | 1/2009 | Cochran .................. | G01W 1/04 340/541 |
| 2010/0033424 A1 * | 2/2010 | Kabasawa .............. | G01C 17/28 345/156 |
| 2010/0107252 A1 * | 4/2010 | Mertoguno ...................... | 726/23 |
| 2010/0281282 A1 * | 11/2010 | Sawyers ........................ | 713/323 |
| 2010/0313050 A1 * | 12/2010 | Harrat et al. ................... | 713/323 |

(Continued)

*Primary Examiner* — Thomas Lee
*Assistant Examiner* — Santosh R Poudel
(74) *Attorney, Agent, or Firm* — Kaplan Breyer Schwarz & Ottersen, LLP (57) ABSTRACT

A power management technique at a mobile station is disclosed that features a dedicated processor for continuously processing sensor data, in addition to a main processor for the conventional processing in the mobile station. The dedicated processor executes a set of data-processing primitives. The data-processing primitives operate on received sensor signals that are based on the monitoring of one or more physical conditions. The processing primitives process the received sensor signals, in which the processing of the signals results in a transitioning of the dedicated processor from one data-processing state to another data-processing state. The transitioning is based on one or more predetermined patterns being detected in the data. The processing performed by the primitives results in the generating of a power management signal based on the transition between states and also results in the transitioning of the main processor to an active mode of processing.

20 Claims, 8 Drawing Sheets

(56) References Cited

U.S. PATENT DOCUMENTS

2011/0060378 A1* 3/2011 Tuysserkani ............... 607/5
2011/0213559 A1* 9/2011 Pollack ............. G05B 23/0221 702/19
2011/0320130 A1* 12/2011 Valdes ............... G06F 19/3418 702/19
2012/0029311 A1* 2/2012 Raptis .................. A61B 5/002 600/301
2013/0044351 A1* 2/2013 Coulson ............ H04N 1/00188 358/1.15
2013/0325378 A1* 12/2013 Allen-Ware ............ G06F 1/329 702/61

* cited by examiner

COMPUTING DEVICE EMPLOYING A PROXY PROCESSOR TO LEARN RECEIVED PATTERNS

CROSS REFERENCE TO RELATED APPLICATIONS

The underlying concepts, but not necessarily the language, of the following application are incorporated herein by reference: U.S. Provisional Patent Application No. 61/729,103, filed Nov. 21, 2012. If there are any contradictions or inconsistencies in language between this case and the above application incorporated by reference that might affect the interpretation of the claims in this case, the claims in this case should be interpreted to be consistent with the language in this case.

FIELD OF THE INVENTION

The present invention relates to processing sensor data in general, and, more particularly, to power management in the presence of sensor data processing.

BACKGROUND OF THE INVENTION

Mobile stations such as smartphones and media players are expected to execute user applications of increasing sophistication. The user applications executed in such device have different levels of security, qualities of service, and memory access and storage requirements, to name a few processing considerations, and often must be executed concurrently. Not surprisingly, these mobile stations are being designed with powerful low-power processors.

Adding to these processing considerations is that the devices often include one or more sensors, or at least sensor data applications, for monitoring and processing physical conditions in the surrounding environment. For example, the devices might be expected to execute sensor data-based applications such as health monitoring, seismic data analysis and monitoring, weather data analysis and monitoring, disruption in secure data transmission, and disruption in secure energy transmission.

Figure 1:
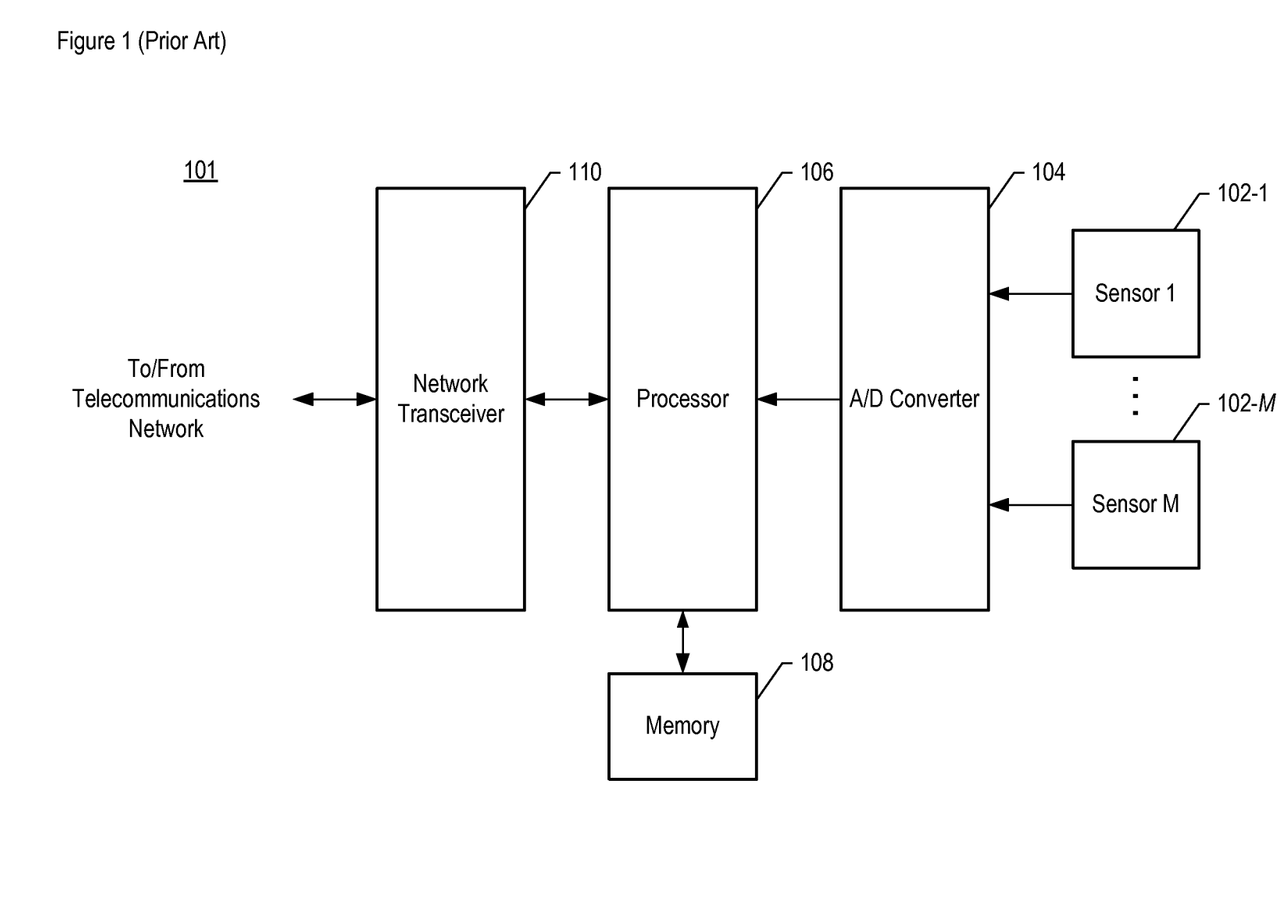
FIG. 1 depicts a schematic diagram of mobile station 101 in the prior art.

FIG. 1 depicts a schematic diagram of mobile station 101 in the prior art. Device 101 comprises sensors 1 through M, wherein M is a positive integer, analog-to-digital (A/D) converter 104, processor 106, memory 108, and network transceiver 110, interconnected as shown. Sensors 102-1 through 102-M each monitor a different physical condition in an environment. A/D converter 104 converts the analog sensor data into digital data, to be processed by processor 106 and stored in memory 108. Some or all of the processed data are then transmitted by network transceiver 110 through a telecommunications network to another node, such as a user workstation or another post-processing station.

In order to adequately process the incoming sensor data, mobile station 101 must continuously convert the sensor data from analog signals to digital data, packetize and transport raw digitized sensor data over complex platform fabric, process the data in processor 106, and store the raw and/or processed data in memory 108. The processing burden on processor 106 can be excessive, as well as the requirement on the electrical power source. Therefore, the need exists for an improved power management technique, particularly in the presence of sensor data processing.

SUMMARY OF THE INVENTION

There are a number of techniques in the prior art for providing power management within a mobile station or other electronic device. Many factors affect the effectiveness of the power management. One such factor is whether the information being received and processed by the mobile station is of a nature in which the mobile station both can ignore some of the information and knows when to ignore the information, in order to put its processor into a "sleep mode." An example of such information is the data that are exchanged in carefully specified data formats and timing across an air-interface communications link, between a radio base station and the mobile station.

In contrast, when the information being received and processed is not of such a predictable nature, achieving power management by turning off the processor at known times is problematic. Such is the case when a mobile station must continuously process incoming sensor data. The resulting processing burden on the processor can be excessive, depending on, among other things, the number of sensors involved, the characteristics of the data passed along by the sensors, the size of the converted data as processed by the analog-to-digital converter, and the processing involved with each application using the sensor data. The requirement on the electrical power source that is used to power the processor might be excessive as well, for similar reasons.

To address this problem, embodiments of the present invention utilize a dedicated processor for continuously processing sensor data, in addition to the main processor for the conventional processing (e.g., call processing, etc.) in the mobile station. Although utilizing two processors instead of a single processor might seem counterintuitive for the purpose of managing overall power, the claimed invention is based on the observation that the dedicated processor can be fine-tuned for performance and power while executing an optimal set of data-processing primitives.

In accordance with the illustrative embodiment of the present invention, such data-processing primitives operate on received sensor signals. The received sensor signals are based on the monitoring of one or more physical conditions such as, while not being limited to, air temperature, composition of gases, and wind speed. The processing primitives process the received sensor signals, in which the processing of the signals results in transitioning from one data-processing state to another data-processing state. The transitioning is based on one or more predetermined patterns being detected in the data conveyed by the signals. The predetermined patterns are specified initially by a user or, in fact, have been learned by the illustrative processing from sensor signals previously received.

The processing performed by the primitives results in i) the generating of a power management signal when the state transition occurs and ii) the transitioning of the main processor from a first power mode that uses little or no power to a second power mode, based on the power management signal, wherein the main processor utilizes more processing resources—and thus more electrical power—while in the second power mode than in the first. In some embodiments of the present invention, only when the second power mode is in effect at the main processor does the main processor process data.

To illustrate the technique disclosed herein, an example of a volcano being monitored is provided here. In the example, it is desirable to predict the eruption of a volcano. It has been shown that the sulfur-to-chlorine ratio in volcanic emissions increases before an eruption, and that the size of the increase is proportional to the size of the eruption. As a result, the eruption prediction can be based on temperature and gaseous emission data correlation.

Continuing with the example, the sensors of the illustrative embodiment are accordingly configured to monitor the physical conditions of one or more gaseous emissions as being present. And when the sulfur-to-chlorine ratio exceeds a predetermined threshold, or is found to be increasing at more than a predetermined rate, the sensor processor of the illustrative embodiment transitions from a first data-processing state to a second data-processing state, resulting in a power management signal being sent to the main processor indicating "active" status. As a result, the main processor is brought into an active mode and processes the meaningful data.

Conversely, when the sensor processor in the example fails to detect the predetermined patterns in the sulfur-to-chlorine ratio, the sensor processor refrains from generating and sending the signal that indicates "active" status. Consequently, the main processor is able to remain in an inactive mode that consumes less power, although it still might increase its power consumption for other reasons unrelated to or uncontrolled by the sensor processor. Such unrelated reasons include the local user making or receiving a telephone call, or sending or receiving a text, email, or other data unrelated to that processed by the sensor processor.

The power management of the illustrative embodiment is described herein as taking place at a mobile station such as a smart phone. However, it will be clear to those skilled in the art, after reading this specification, how to make and use alternative embodiments of the present invention in which the power management disclosed herein can be implemented in any type of electronic device.

A first illustrative embodiment of the present invention comprises: a first sensor for monitoring a first physical condition, resulting in data conveyed by a first signal; a first processor for: i) processing the data conveyed by the first signal, resulting in the first processor transitioning from a first data-processing state to a second data-processing state, wherein the transitioning of the first processor is based on a predetermined first pattern being detected by the first processor in the data conveyed by the first signal, and ii) generating a second signal, wherein the second signal is based on the transitioning of the first processor to the second data-processing state; and a second processor for processing at least a portion of the data conveyed by the first signal, according to a first power mode that is based on the second signal.

A second illustrative embodiment of the present invention comprises: monitoring a first physical condition, by a first sensor, resulting in data conveyed by a first signal; processing the data conveyed by the first signal, by a first processor, resulting in the first processor transitioning from a first data-processing state to a second data-processing state, wherein the transitioning of the first processor is based on a predetermined first pattern being detected by the first processor in the data conveyed by the first signal; generating a second signal, by the first processor, wherein the second signal is based on the transitioning of the first processor to the second data-processing state; and processing, by the second processor, at least a portion of the data conveyed by the first signal, according to a first power mode that is based on the second signal.

A third illustrative embodiment of the present invention comprises: receiving data conveyed by a first signal that are based on monitoring of a first physical condition; processing the received data conveyed by the first signal, resulting in the first processor transitioning from a first data-processing state to a second data-processing state, wherein the transitioning of the first processor is based on a predetermined first pattern being detected by the first processor in the data conveyed by the first signal; generating a second signal, wherein the second signal is based on the transitioning of the first processor to the second data-processing state; and transmitting the second signal to a second processor such that the second processor is directed to process at least a portion of the data conveyed by the first signal, according to a first power mode that is based on the second signal.

DETAILED DESCRIPTION

Figure 2:
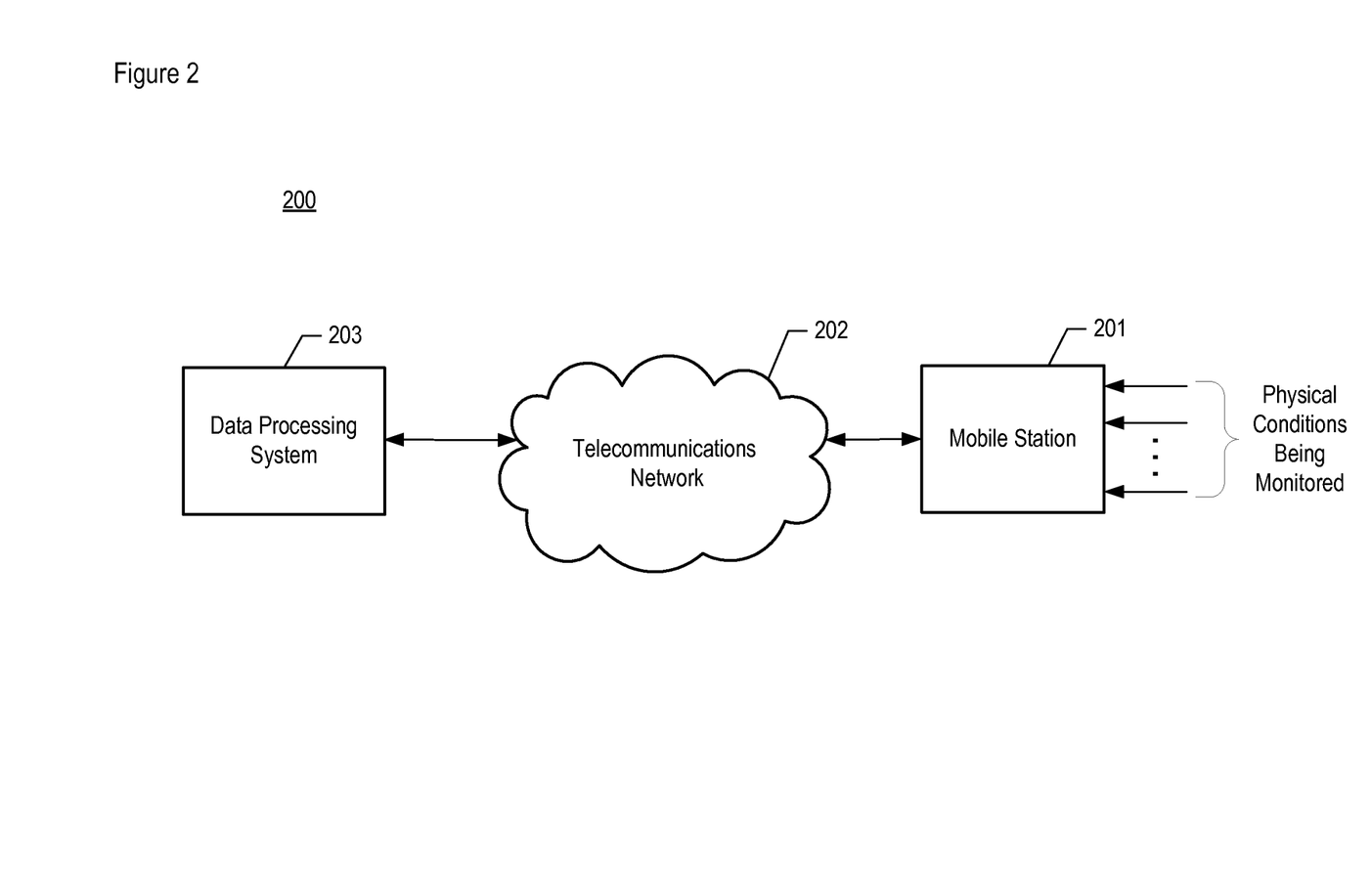
FIG. 2 depicts communications system 200 in accordance with the illustrative embodiment of the present invention.

FIG. 2 depicts communications system 200 in accordance with the illustrative embodiment of the present invention. System 200 comprises mobile station 201, telecommunications network 202, and data processing system 203, interconnected as shown.

Mobile station 201 monitors one or more physical conditions and processes sensor data that are produced as a result of the monitoring. Station 201 monitors and processes the data using a subset of its hardware and software resources. Based on the sensor data, station 201 performs further processing by using additional hardware and software resources. Mobile station 201 is described in further detail below and with respect to FIG. 3.

In accordance with the illustrative embodiment, mobile station 201 is a wireless telecommunications terminal (or "wireless terminal") that is capable of transmitting and/or receiving communications wirelessly. As is well known to those skilled in the art, a mobile station is also commonly referred to by a variety of alternative names such as a wireless transmit/receive unit (WTRU), a user equipment (UE), a wireless terminal, a fixed or mobile subscriber unit, a pager, a cellular telephone, a personal digital assistant (PDA), a computer, or any other type of device capable of operating in a wireless environment. It will be clear to those skilled in the art, however, after reading this specification, how to make and use alternative embodiments of the present invention in which mobile station 201 is something other than a wireless terminal, such as a sensor node that operates at a fixed position.

Communications system 200 is depicted as comprising a single, mobile station (i.e., station 201). However, it will be clear to those skilled in the art, after reading this specification, how to make and use alternative embodiments of the present invention in which more than one mobile station—or other type of electronic device, for that matter—is present.

Telecommunications network 202 enables, in well-known fashion, one or more mobile stations to transmit information to, and receive information from, other devices, such as data processing system 203. In accordance with the illustrative embodiment of the present invention, network 202 comprises a wireless network that is based on a standardized set of protocols (e.g., Global System for Mobile Communications "GSM", Universal Mobile Telecommunications System "UMTS", Long Term Evolution "LTE", CDMA-2000, IS-136 TDMA, IS-95 CDMA, 3G Wideband CDMA, IEEE 802.11 WiFi, IEEE 802.16 WiMax, Bluetooth, and so on. However, it will be clear to those skilled in the art, after reading this specification, how to make and use alternative embodiments of the present invention in which network 202 comprises a different type of network other than, or in addition to, a wireless network.

Data processing system 203 receives the data monitored and processed by mobile station 201, and performs operations on the received data. Such operations include presenting the data to a user, in well-known fashion.

Figure 3:
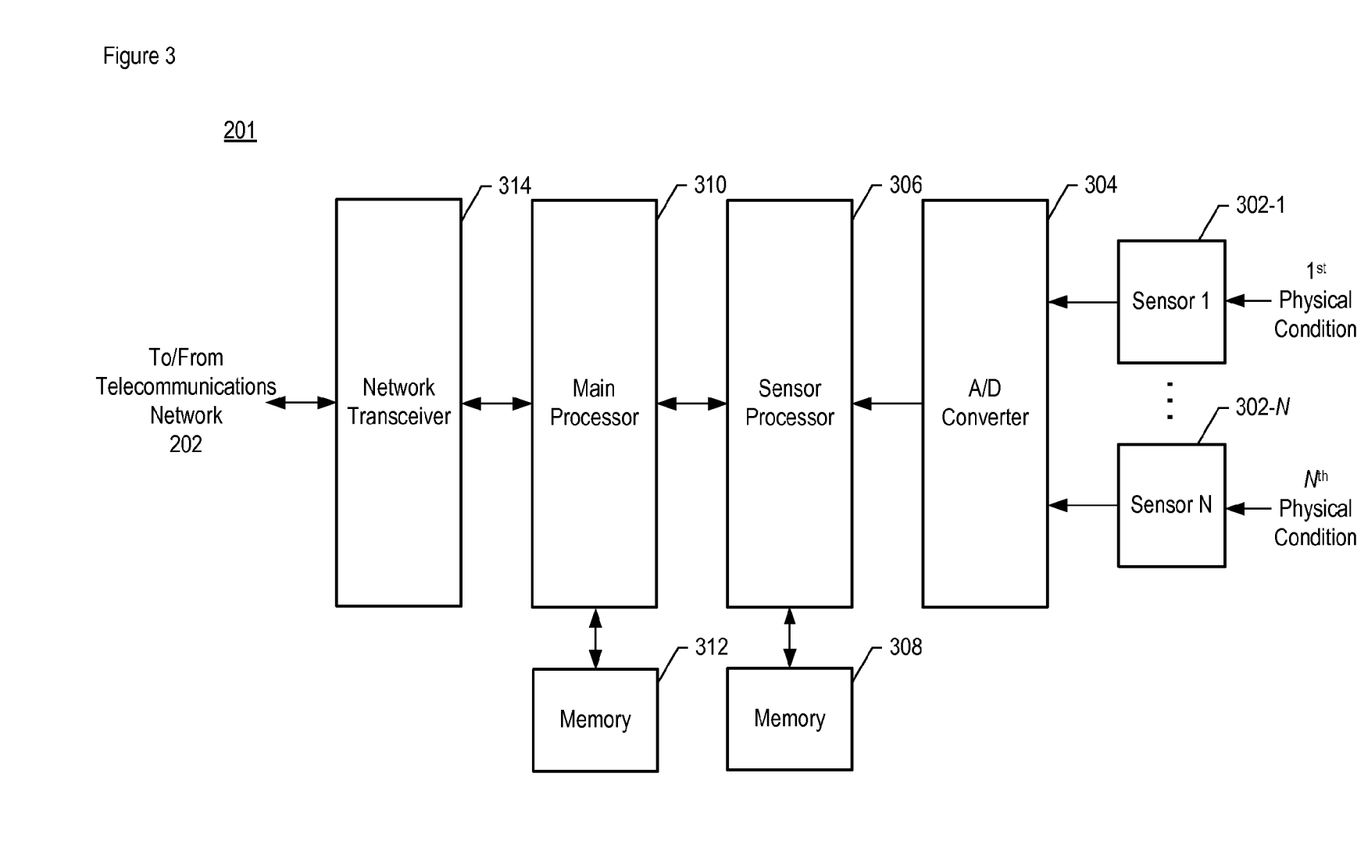
FIG. 3 depicts a schematic diagram of mobile station 201, in accordance with the illustrative embodiment of the present invention.

FIG. 3 depicts a schematic diagram of mobile station 201, in accordance with the illustrative embodiment of the present invention. Mobile station 201 comprises sensors 302-1 through 302-N, wherein N is a positive integer; analog-to-digital (A/D) converter 304; sensor processor 306; sensor memory 308; main processor 310; main memory 312; and network transceiver 314. The elements that are depicted in FIG. 3 are interconnected as shown.

Sensor 302-n, wherein n is equal to 1 through N, inclusive, is a device that monitors a particular physical condition, in well-known fashion. Sensor 302-n measures physical data of the condition being monitored. The sensor produces a measurable response to a change in the physical condition. The sensor produces a continuous analog signal, which can be digitized and processed. For example and without limitation, the physical condition being monitored can be:

i. air temperature,
 ii. wind speed,
 iii. pressure,
 iv. the composition of a gas (e.g., air, etc.),
 v. other physical conditions related to gaseous emissions,
 vi. seismic activity,
 vii. heart rate,
 viii. blood pressure,
 ix. body temperature.

As those who are skilled in the art will appreciate, after reading this specification, sensor 302-n is capable of monitoring a physical condition in a variety of locations, such as near a volcano, at a chemical manufacturing plant, where hazardous materials are used or stored, at or within the human body or another life form, and so on.

The following is an example of physical conditions that sensors 302-1 through 302-N can monitor and that other components of mobile station 201 can process as described throughout this specification. In the example, it is desirable to predict the eruption of a volcano and, after it has erupted, the rate at which the resultant plume of particulates will disperse into the atmosphere. It has been shown that the sulfur-to-chlorine ratio in volcanic emissions increases before an eruption, and that the size of the increase is proportional to the size of the eruption. As a result, the eruption prediction can be based on temperature and gaseous emission data correlation. Also, the dispersion prediction can be based on wind direction and speed. The sensors of the illustrative embodiment are accordingly configured to monitor three physical conditions: gaseous emissions, temperature, and wind speed.

In accordance with the illustrative embodiment of the present invention, each of multiple sensors 302-1 through 302-N monitors a different physical condition. For example, when used to monitor volcanic activity, sensor 302-1 can monitor seismic activity, sensor 302-2 can monitor whether a particular gas is present in the air, and sensor 302-3 can monitor air temperature.

In some alternative embodiments of the present invention, one or more of sensors 302-1 through 302-N are external to mobile station 201. In these alternative embodiments, mobile station 201 receives analog signals provided by the external sensors.

Analog-to-digital (A/D) converter 304 converts analog signals that are provided by sensors 302-1 through 302-N into digital data, in well-known fashion. A/D converter 304 is depicted in FIG. 3 as a single component of mobile station 201. In some alternative embodiments of the present invention, multiple A/D converters can be included in the depicted circuitry (e.g., an A/D converter paired with each sensor 302, etc.), as those who are skilled in the art will appreciate. In some other alternative embodiments of the present invention, the A/D converter can be part of sensor 302-n, wherein each sensor comprises its own A/D converter, as those who are skilled in the art will appreciate.

In still some other alternative embodiments of the present invention, A/D converter 304 is external to mobile station 201. In these alternative embodiments, mobile station 201 receives digitized signals provided by the external A/D converter or converters.

Sensor processor 306 comprises processing circuitry that is operative to process digitized signals that are received from A/D converter 304 and that are based on the sensor signals generated by sensors 302-1 through 302-N. Sensor processor 306 performs the tasks that are described below and with respect to FIGS. 4 through 6, including generating a power management signal to be used by main processor 310. In the course of performing the described tasks, sensor processor 306 stores data in sensor memory 308. In some embodiments of the present invention, the only data processed by sensor processor 306 that originate externally from mobile station 201 are the sensor data that correspond to the one or more physical conditions being monitored. In any event, it will be clear to those skilled in the art, after reading this specification, how to make and use sensor processor 306.

Main processor 310 is physically distinct from sensor processor 306 and comprises processing circuitry that is operative to process a power management signal and data that are received from sensor processor 306. Main processor 310 performs the tasks that are described below and with respect to FIGS. 7 and 8. In the course of performing the described tasks, main processor 310 stores data in main memory 312. Main processor 310 is also capable of performing tasks that are typically associated with a main processor in a mobile station such as, while not being limited to, control of a telecommunications call or session.

Main processor 310 operates in various power management modes in order to conserve power in certain situations. For example, main processor 310 might be configured to switch from a first power mode that uses little or no electrical power or processing resources, to a second power mode that does use electrical power and processing resources, when a power management signal that indicates a power-up condition has been received from sensor processor 306. Likewise, main processor 310 might be configured to switch from the second power mode back to the first power mode when a power management signal that indicates a power-down condition has been received from sensor processor 306. In any event, it will be clear to those skilled in the art, after reading this specification, how to make and use main processor 310.

Sensor memory 308 and main memory 312 directly support sensor processor 306 and main processor 310, respectively. Each of memories 308 and 312 comprise non-volatile, flash memory. One or both of memories 308 and 312 store an operating system, the software that represents the tasks that are described below and with respect to FIGS. 4-7, and sensor data. Additionally, one or both of memories 308 and 312 may store other software, firmware, any other suitable data, or any combination thereof.

In some alternative embodiments of the present invention, one or both of memories 308 and 312 may include one or more types of storage media other than, or in addition to, the flash memory. Such storage media include, for example and without limitation, a hard-drive, solid-state drive, permanent memory such as read-only memory ("ROM"), semi-permanent memory such as random access memory ("RAM"), any other suitable type of storage component, or any combination thereof. One or both of memories 308 and 312 may include cache memory, which may be one or more different types of memory used for temporarily storing data.

In accordance with the illustrative embodiment of the present invention, memories 308 and 312 are physically distinct elements. In some alternative embodiments of the present invention, however, memories 308 and 312 can be implemented as a single unit. In any event, it will be clear to those skilled in the art, after reading this specification, how to make and use memories 308 and 312.

Network transceiver 314 enables mobile station 201 to transmit information to and/or receive information from one or more other devices, such as data processing system 203, via telecommunications network 202. Network transceiver 314 communicates with data processing system 203 and other devices using any suitable communications protocol. For example, transceiver 314 may support Wi-Fi (e.g., an 802.11 protocol), Ethernet, Bluetooth™, high frequency systems (e.g., 900 MHz, 2.4 GHz, and 5.6 GHz communication systems), cellular networks (e.g., GSM, AMPS, GPRS, CDMA, EV-DO, EDGE, 3GSM, DECT, IS-136/TDMA, iDen, LTE, or any other suitable cellular network or protocol), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), voice over internet protocol ("VoIP"), any other communications protocol, or any combination thereof. Transceiver 314 may also include circuitry that can enable device 201 to access or be accessed by another device than system 203 (e.g., another mobile station, etc.), and to communicate with that other device, either wirelessly or via a wired connection.

FIGS. 4, 5, 7, and 8 depict flowcharts of the salient processes performed by mobile station 201, in accordance with the illustrative embodiment of the present invention. The processes performed by mobile station 201 of the illustrative embodiment are depicted in the drawings as being performed in a particular order. It will, however, be clear to those skilled in the art, after reading this disclosure, that these operations can be performed in a different order than depicted or can be performed in a non-sequential order (e.g., in parallel, etc.). In some embodiments of the present invention, some or all of the depicted processes might be combined or performed by different devices. For example, main processor 310 might perform some of the tasks that are depicted as being performed by sensor processor 306, and vice-versa. In some embodiments of the present invention, some of the depicted processes might be omitted.

Figure 4:
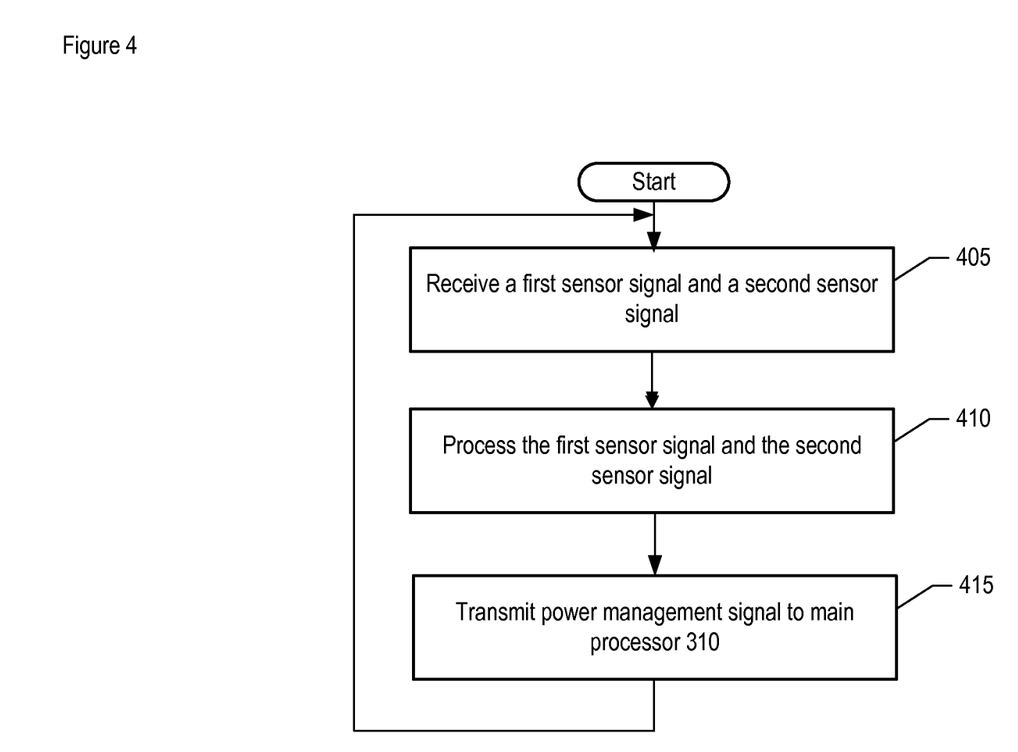
FIG. 4 depicts a flowchart of the salient processes performed by sensor processor 306, in accordance with the illustrative embodiment of the present invention.

FIG. 4 depicts a flowchart of the salient processes performed by sensor processor 306, in accordance with the illustrative embodiment of the present invention.

In accordance with process 405, processor 306 receives one or more sensor signals. For example and without limitation, a first sensor signal can be received that is based on seismic activity being monitored by sensor 302-1, and a second sensor signal can be received that is based on presence of a particular gas being monitored by sensor 302-2.

In accordance with process 410, processor 306 processes the one or more sensor signals received in accordance with process 405. Process 410 is described in further detail below and in FIG. 5.

In accordance with process 415, processor 306 transmits a power management signal to main processor 310, which signal was generated in accordance with process 410. In some alternative embodiments of the present invention, processor 306 uses a mechanism other than a power management signal to convey to main processor 310 whether to assume a particular power mode (e.g., high-power mode, a low-power mode, etc.).

After process 415, task execution proceeds back to process 405.

Figure 5:
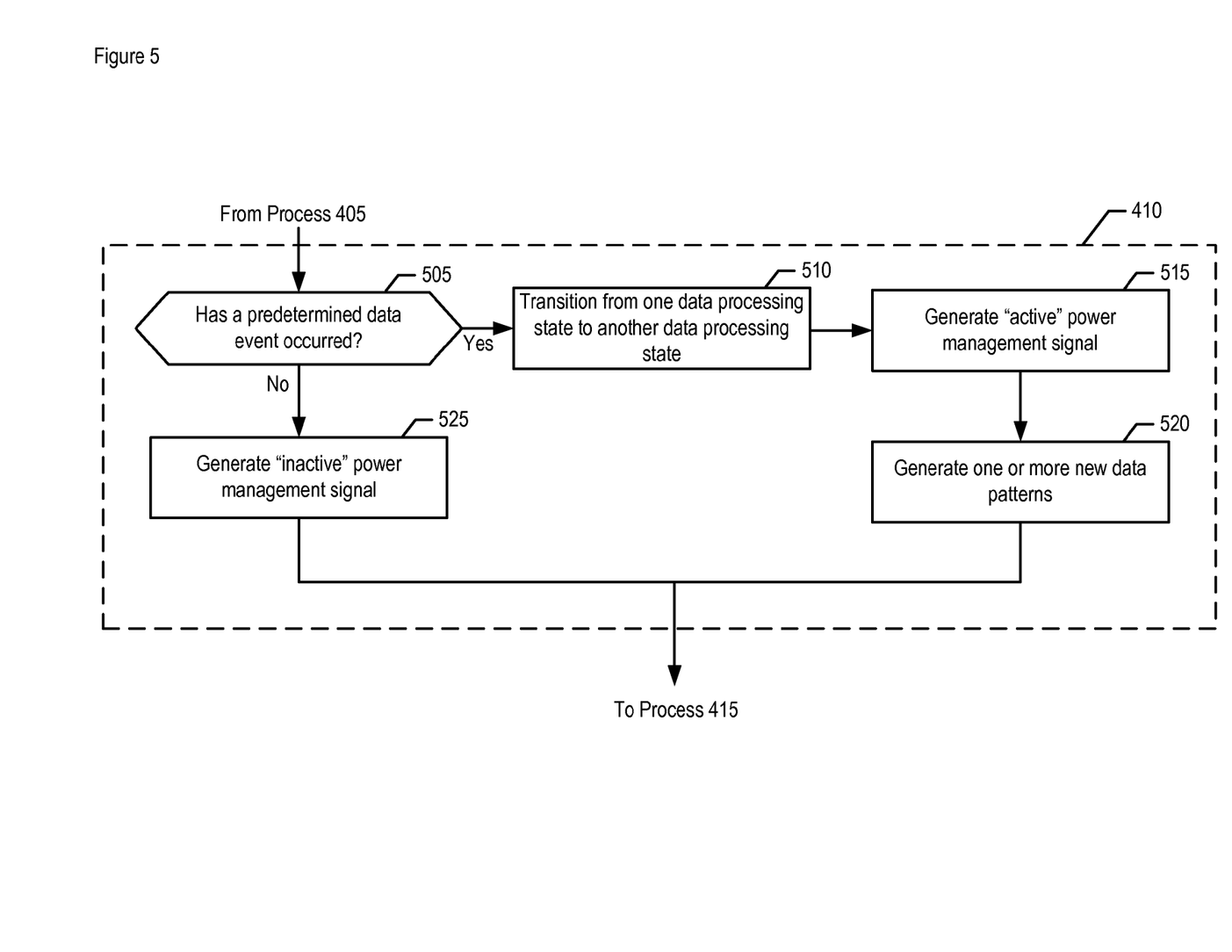
FIG. 5 depicts a flowchart of the salient processes performed in accordance with process 410.

FIG. 5 depicts a flowchart of the salient processes performed in accordance with process 410.

In accordance with process 505, processor 306 determines whether an event has occurred that corresponds to sensor data conveyed in one or more of the received sensor signals. Processor 306 executes one or more primitives, or algorithms. Each primitive is dedicated to determining one or more of the following data events as occurring, for example and without limitation:
  i. detection of one or more predetermined, known patterns in the sensor data (i.e., data patterns),
  ii. detection of cyclic or repetitive data in the sensor data, exhibiting one or more predetermined, known data patterns,
  iii. detection of a deviation in a known data pattern,
  iv. detection of a deviation from a standard and/or known variation in the sensor data,
  v. detection of one or more tolerable and/or permissible data events,
  vi. detection of one or more data events that are required to raise an alarm,
  vii. detection of a sequence of two or more "data events" or pattern sets,
  viii. binning,
  ix. detection of random data that can be categorized into bins,
  x. deviation or disruption in bin growth.

These data events have been initialized, either on the basis of user input or generated in accordance with process 520 (discussed below), or both, and stored in memory 308.

The bin-related data events listed above are explained here. While monitoring a physical condition via sensor 302-n (e.g., gaseous emissions present), wherein an unknown physical process may be represented in the sensor data of the monitored condition (e.g., deformation of volcano surface followed by explosion), the method used in some embodiments of the present invention classifies the digitized data into various ranges. Examples of the ranges could be detected voltages from 0-1 Volt (V), 1-2 V, and so on. Each of these ranges can be referred to as a "bin." When sensor 302-n encounters a voltage range that falls into any one of the existing bins, then that bin is said to grow by a unit count. If a new voltage is reported by sensor 302-n that does not fall into any of the existing ranges, then a new bin is added to the existing set of bins. The creation of this new bin can potentially be the creation of a new "known state," as described below. As a result of this new known state, sensor processor 306 reports the corresponding sensor data or an indication of a state change (i.e., from "unknown" to "known"), or both, to main processor 310 as described below. In some embodiments of the present invention, the creation of the new bin would be classified as disruptive bin growth.

In a further aspect of bin-related data events, if one or more existing bins (e.g., the "0-1 V" bin, the "1-2 V" bin, etc.) showed a steady growth rate over a long or other predetermined period of time and, subsequently, if the growth rate of one or more of those existing bins (e.g., the "1-2 V" bin, etc.) increased at a relatively faster rate than before, then this could be classified as a deviation in the growth rate of one of the bins. In some embodiments, the detected presence of such a deviation could result in a reclassifying of the corresponding sensor data, from an "unknown state" to a "known state," as described below, and/or the creation of a new "known state."

In some of the aforementioned examples, an event is based on having detected one or more known patterns in the sensor data. These known patterns can be initialized and stored in memory 308 prior to commencing execution of the processes depicted in FIGS. 4 and 5, or can be learned and generated during execution of the depicted processes, such as in accordance with process 520 described below.

Sensor processor 306 is capable of maintaining a set of data processing states and of transitioning from one data processing state to another data processing state, as described in detail below. The sensor processor is aware of the physical conditions that are being monitored by the sensors and is responsible for recognizing any of a plurality of data events (e.g., predetermined data patterns) occurring in the physical conditions. Accordingly, the sensor processor maintains a set of predetermined, data-processing states that it may transition to as a result of detecting a single data event, a combination of multiple data events occurring concurrently, a sequence of data events occurring, and so on.

In some embodiments of the present invention, processor 306 tracks events as having occurred, on a sensor-by-sensor basis. For example, processor 306 might determine that an event has occurred based on the data conveyed by the sensor signal received from sensor 302-1, while processor 306 might concurrently determine that no event has occurred based on the data conveyed by the sensor signal received from sensor 302-2. Additionally, processor 306 might determine that an overall event has occurred only when individual events have occurred in data conveyed from both sensors 302-1 and 302-2.

Processor 306, in some alternative embodiments of the present invention, can use means other than processing primitives in order to determine one or more of the aforementioned data events as occurring.

When processor 306 has determined, in process 505, that one or more of the predetermined events have occurred, processor 306 transitions from one data processing state to another data processing state in accordance with process 510. Each "data processing state" is defined as i) the particular condition in which a particular set of one or more predefined data events can occur, the occurrence of which results in a data event-dependent transition to a different processing state. In some alternative embodiments of the present invention, each data processing state can be defined as ii) the particular condition that results from a particular, predefined data event or events having occurred while in a previous data processing state, while in some other alternative embodiments, each data processing state can be defined as a combination of the aforementioned definitions i) and ii). In some cases, a given state can be transitioned-to from more than one other state and based on different data sets occurring, as explained below.

Figure 6:
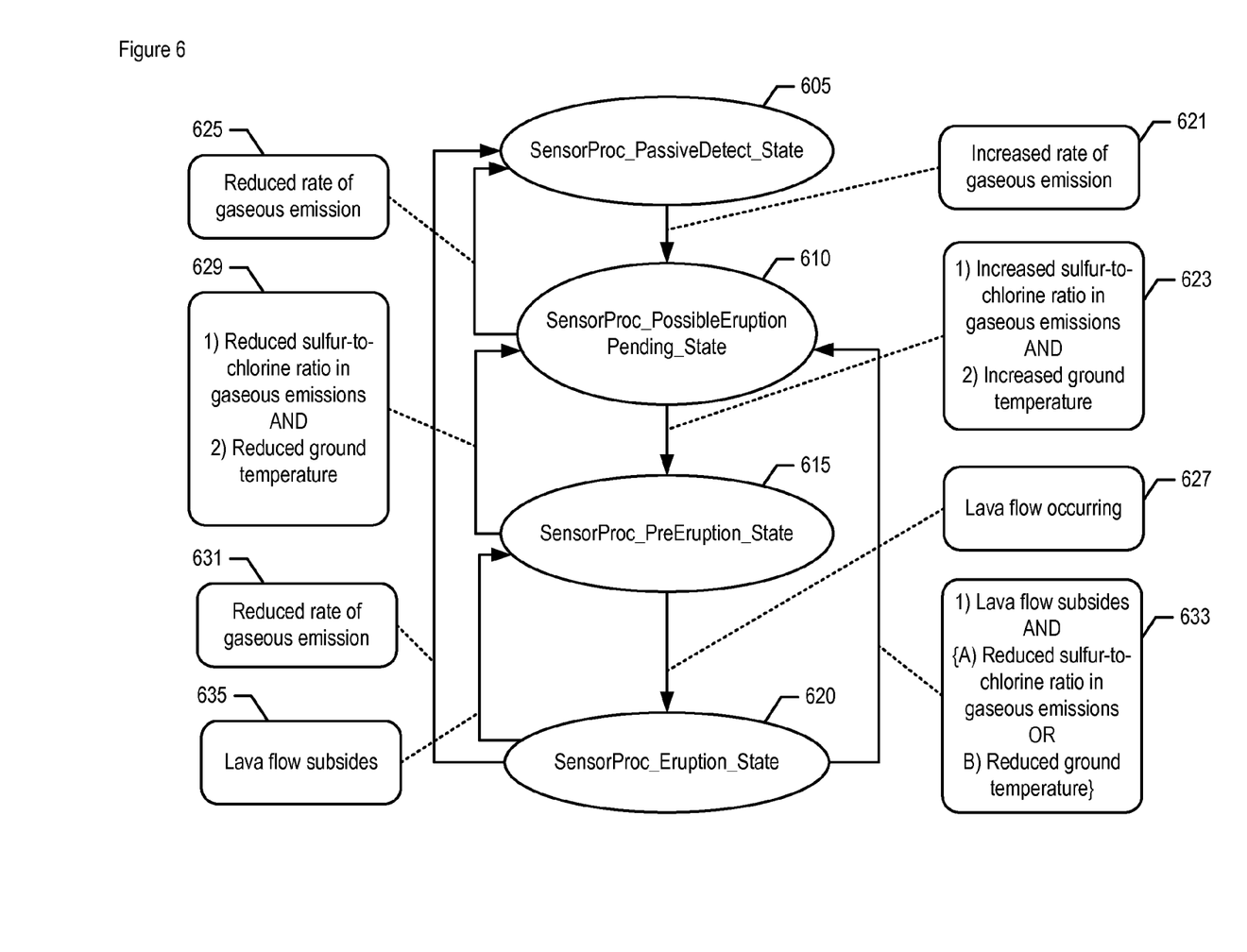
FIG. 6 depicts an example of sensor processor 306 transitioning between multiple, data-processing states.

FIG. 6 depicts an example of sensor processor 306's movement between data processing states. Processor 306 spends much of its time in data processing state 605, labeled "SensorProc_PassiveDetect_State." In this state, processor 306 is continually evaluating whether any predefined data event is occurring. When predefined data event 621 occurs, which corresponds to an increased rate of gaseous emission being detected, processor 306 moves from state 605 to state 610. State 610 is labeled "SensorProc_PossibleEruption-Pending_State." This state corresponds to the possibility of a volcanic eruption being detected at some point in the future. In this state, processor 306 monitors for data events that will either more strongly confirm that an eruption will take place or that a false alarm has occurred. When data event 623 occurs, which corresponds to i) an increased sulfur-to-chlorine ratio in gaseous emissions and ii) an increased ground temperature, processor 306 moves from state 610 to state 615. State 615 is labeled "SensorProc_PreEruption_State." This state corresponds to the strong possibility of a volcanic eruption being detected at some point in the near future. In this state, processor 306 monitors for data events that will either confirm that an eruption is indeed occurring or that the pre-eruption is abating.

Alternatively, when data event 625 occurs, which corresponds to a reduced rate of gaseous emission being detected, processor 306 moves from state 610 back to state 605.

While in state 615, when data event 627 occurs, which corresponds to lava flow being detected, processor 306 moves from state 615 to state 620. State 620 is labeled "SensorProc_Eruption_State." In this state, processor 306 monitors for data events related to an eruption already having taken place (i.e., data events 631, 633, and 635) and, when a specific data event occurs, moves to a different state as appropriate for that data event.

Alternatively, when data event 629 occurs, which corresponds to i) reduced sulfur-to-chlorine ratio and ii) reduced ground temperature, processor moves back to state 610 from state 615.

In some embodiments of the present invention, processor 306 transforms the sensor data, in which the sensor data that are transformed corresponds to at least some of the sensor data operated on in process 505. When an event is determined to have occurred, the sensor data are reclassified from data of an "unknown state" into data of a "known state." As those who are skilled in the art will appreciate, after reading this specification, data are reclassified into a known state by identifying (e.g., tagging, etc.) them as such, by storing them in different memory than before, or by otherwise treating them differently from data in an unknown state.

Transformation of the sensor data can comprise changing the data itself, instead of or in addition to reclassifying the data from the "unknown state" category to the "known state" category. Such changes made to the data can include, for example and without limitation:

i. compression of some or all of the sensor data. The compression of the data facilitates storage into memory 308 or transfer to processor 310, or both.
  ii. replacing the data with another type of datum or data, such as a value that indicates "event has occurred," "alarm condition is met," and so forth.
  iii. generation of rule sets from existing knowledge.

As an example of generating rule sets, based on gaseous emissions at volcanic eruption sites, it has been shown that the sulfur-to-chlorine ratio increased prior to the eruption, as mentioned earlier. This is a knowledge-based rule that may be provided to sensor 302-n or processor 306, or both. However, at a volcanic site where the rocks have a different chemical composition, the gaseous ratio that increases may be different. Hence, the processing responsible for monitoring the gaseous emission from an active volcano at this site may compute the gaseous ratios of all detected gases. The rule here would be to not only monitor the sulfur-to-chlorine ratio, but also all of the relative volumes of all other detected gases at this site. Here, the sensor processing would be attempting to learn a site-specific rule during the monitoring process; when it detects a sudden increase in the volume of any one gas, it may generate a power management signal, as described below.

In accordance with process 515, processor 306 generates a power management signal, as described here. After having transitioned to a different data-processing state, processor 306 conveys to main processor 310 a power management signal that indicates i) the transitioned-to data-processing state, ii) the power mode corresponding to the transitioned-to state, and/or iii) some other indication that is reflective of the transition in states. As discussed below and with respect to FIGS. 7 and 8, main processor 310 is able to act on the power management signal transmitted by sensor processor 306. The power management signal can be based on i) the state being transitioned-to or ii) the state being transitioned from, or both.

In some embodiments of the present invention, sensor processor 306 describes the processing and/or power that is required of main processor 310, in regard to processing the corresponding data received from the sensors. For example, processor 306 might indicate for processor 310 to turn off a processor core, turn on all processor cores, use a single memory bank, use all memory banks, and so on. Processor 306 encodes this processing description, wherein the encoded message is conveyed by the power management signal.

In some embodiments of the present invention, the generated power management signal indicates "active" status. Active status applies when sensor data has been transformed into a known state as described above and in process 510. Active status signifies that main processor 310 is to wake up if currently in a low-power consumption mode.

As an example of generating power management signals, and referring to FIG. 6, a first power management signal (e.g., indicating a first power mode with a first level of required processing resources, etc.) can be generated and sent as a result of a transition into state 605. A second power management signal (e.g., indicating a second power mode with a second level of required processing resources, etc.) can be generated and sent as a result of a transition into state 610. A third power management signal (e.g., indicating a third power mode with a third level of required processing resources, etc.) can be generated and sent as a result of a transition into state 615. And a fourth power management signal (e.g., indicating a fourth power mode with a fourth level of required processing resources, etc.) can be generated and sent as a result of a transition into state 620. Further differentiation of power modes are possible based on the state that the processor is transitioning from.

In accordance with process 520, processor 306 learns and generates one or more new, known data patterns. These new data patterns can be used in future iterations of process 505, in order to determine one or more future events as occurring. In accordance with the illustrative embodiment, one or more of the following actions are taken in order to generate the data pattern or patterns, for example and without limitation:

i. characterizing the new patterns with hitherto unknown patterns, over a predetermined period of observation,
   ii. binning, as explained earlier,
   iii. detecting random data that can be categorized into bins,
   iv. detecting deviation or disruption in bin growth, In some embodiments of the present invention, sensor processor 306 may grow or shrink its set of processing states based on the detection of new data events, such as the data patterns described above, or based on user input.

After process 520, process execution proceeds to process 415.

Alternatively, in accordance with process 525 when a pattern has not been detected at process 505, processor 306 generates a power management signal indicating "inactive" status. Inactive status applies when a predetermined event is not detected as having occurred, as described above and in process 505. Inactive status signifies that main processor 310 is to be put into a low-power consumption mode, if not already in such a mode. Processor 306 discards irrelevant data or data sets from the currently-received data without further processing.

In some embodiments of the present invention, processor 306 refrains from generating the power management signal indicating "active" status when sensor data in the known state are absent, in addition to or instead of generating the power management signal indicating "inactive" status.

In some embodiments of the present invention, processor 306 can generate a power management signal that indicates inactive status, based on one or more of the following events, for example and without limitation:
   i. when no event has been detected for a predetermined amount of time,
   ii. when a reversal has been detected in a trend that resulted in a event as having been detected.

In the reversal-in-trend example above, referring to the example of volcanic emissions detection introduced earlier, processor 306 can generate a power management signal that indicates inactive status when after having detected a heightened sulfur-to-chlorine ratio, the processor detects a reversal in the growth trend in said ratio over a predetermined length of time.

Process execution then proceeds to process 415.

In some embodiments of the present invention, processor 306 is able to recognize and discard irrelevant data or data sets from the physical condition or conditions being monitored.

Figure 7:
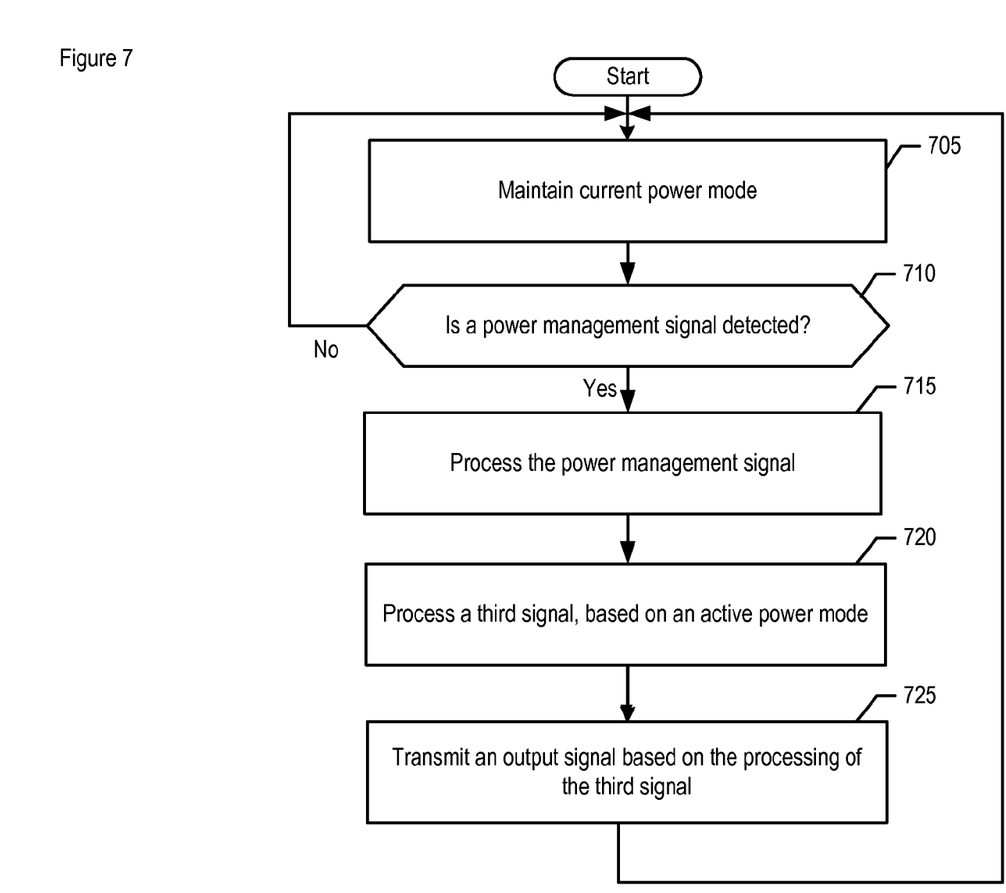
FIG. 7 depicts a flowchart of the salient processes performed by main processor 310, in accordance with the illustrative embodiment of the present invention.

FIG. 7 depicts a flowchart of the salient processes performed by main processor 310, in accordance with the illustrative embodiment of the present invention.

In accordance with process 705, processor 310 maintains its current power mode, at least until it receives an indication to change from one power mode to another. For example, when processor 310 is in a low-power mode, it will remain in such a mode until it receives an indication from processor 306 to change modes or it receives an indication from elsewhere.

In accordance with process 710, processor 310 detects whether a power management signal has been received. If no power management signal has been received, process execution proceeds back to process 705. If, however, a power management signal has been received, process execution proceeds to process 715.

In accordance with process 715, processor 310 processes the power management signal. Process 715 is described below and in FIG. 8.

In accordance with process 720, main processor 310 processes transformed data (e.g., compressed sensor data, status indication, alarm, etc.) provided by sensor processor 306. In accordance with the illustrative embodiment, the transformed data is processed when and only when processor 310 is in an active power mode and has been put in that mode by the power management signal received from processor 306. The processing performed on the data by processor 310 may comprise, for example and without limitation, numerical analysis of the data, translation of the data into one or more alerts or alarms, setting up a transmission of the data to data-processing system 203 or another device, and so on.

In some alternative embodiments of the present invention, processor 310 in process 720 operates on a different set of data than the transformed data from processor 306, instead of or in addition to the transformed data.

In accordance with process 725, network transceiver 314 transmits an output signal that is based on the processing occurring in accordance with process 720. For example and without limitation, interface 314 can transmit an output signal to data processing system 203 for the purpose of presenting processed results to one or more users. In some embodiments of the present invention, transceiver 314 transmits the output signal only when main processor 310 is in the active power mode.

After process 725, process execution proceeds back to process 605.

Figure 8:
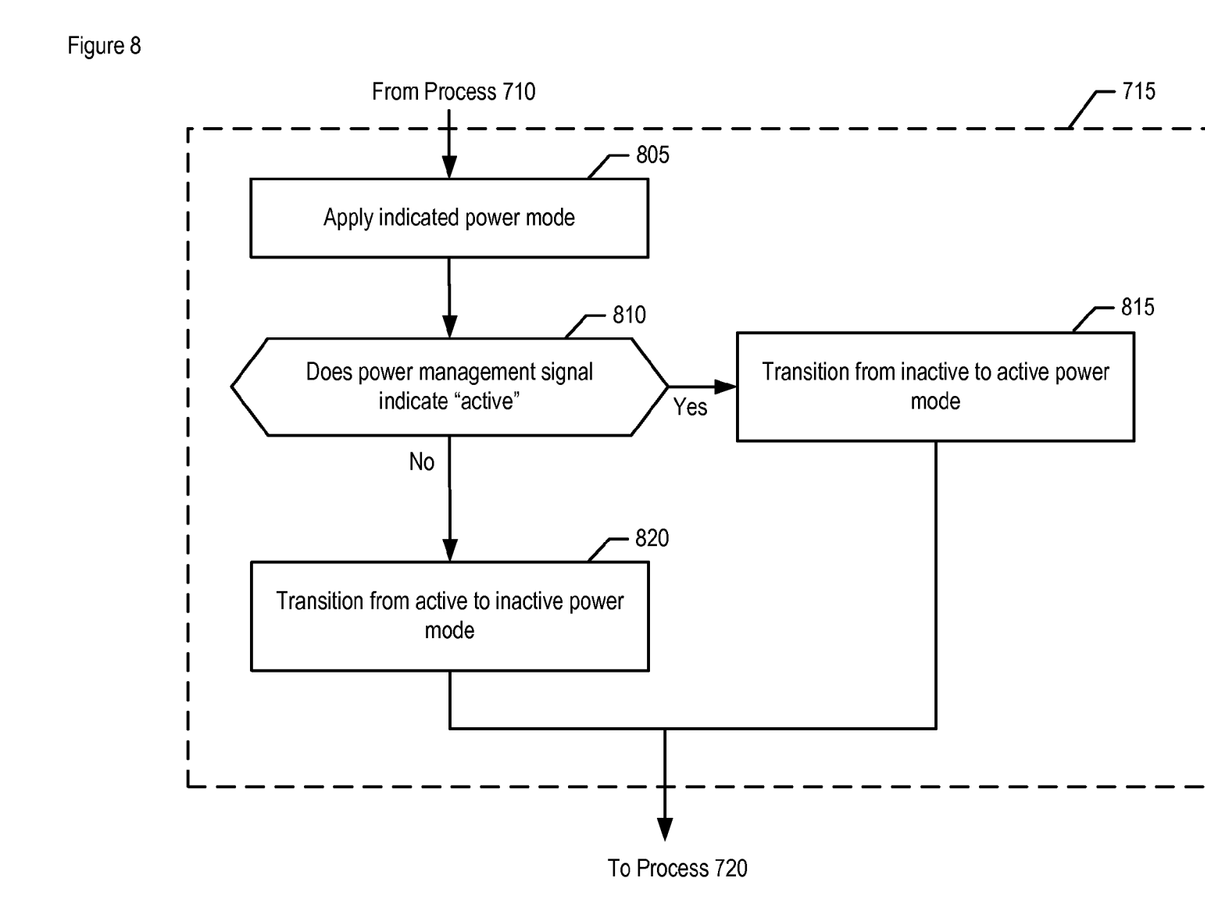
FIG. 8 depicts a flowchart of the salient processes performed in accordance with process 715.

FIG. 8 depicts a flowchart of the salient processes performed in accordance with process 715.

In accordance with process 805, processor 310 applies the power mode indicated in the power management signal received from processor 306. The indication of power mode can be explicit in some embodiments of the present invention or can be inferred in some other embodiments. In applying the power mode indicated, processor 310 interprets this power management signal to transition to one of multiple power modes that it maintains, in order to perform the follow-up action that is required from the detection of the specific set of data events, or sequence of sets of data events, discussed earlier.

Each power mode is associated with a particular amount of electrical power required for processing, or a particular set or level of processing resources required for processing, or both. Processor 310's decision to enter a particular power mode may be determined by the amount of power or combination of processing resources that will be consumed by the follow-up action (e.g., processing the sensor data, etc.). For example, when a first power mode is indicated, processor 310 may turn on only a single core of a multi-core processor and power only one bank of memory. When a second power mode is indicated, processor 310 may turn on both processor cores and two banks of memory. As those who are skilled in the art will appreciate, after reading this specification, multiple combinations of processing resources can be defined, with each combination being associated with a particular power mode.

In accordance with process 810, in some embodiments of the present invention, processor 310 determines whether the power management signal received from processor 306 indicates transition to an active mode. If such a transition is indicated, process execution proceeds to process 815. Otherwise, process execution proceeds to process 820.

In accordance with process 815, processor 310 transitions from an inactive power mode to an active power mode, based on the power management signal indicating "active." In the active power mode, processor 310 consumes more power than when the processor is in the inactive power mode.

Referring back to the example of gaseous emission detection at a volcanic site, processor 310 transitions to the active power mode (e.g., a second power mode from a first power mode, etc.), it can then report to the user interface or trigger an application that computes the correlation between the reported specific gaseous emission detection and rock composition information to surmise any higher level of information or observation. Thus, the power consumption of main processor 310 would be restricted to the latter processing and not be required for monitoring and analyzing the gaseous emission detection process that is typified by large data volumes.

After process 815, process execution proceeds to process 720.

In accordance with process 820, processor 310 transitions from an active power mode to an inactive power mode. In some alternative embodiments of the present invention, in process 820, processor 310 transitions from a second power mode to a first power mode. Using the volcanic emissions example above, based on the inactive power mode main processor 310 might decide to decrease any alert levels in effect, for example and without limitation.

After process 820, process execution proceeds to process 720.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a first sensor for producing a continuous analog signal while monitoring a first physical condition during a first time interval, wherein the continuous analog signal is digitized to produce a first signal having data that is indicative of the first physical condition, and wherein the data is classified into a first voltage range among a plurality of voltage ranges;
   a first processor for:
      i) processing the data conveyed by the first signal, resulting in the first processor transitioning from a first data-processing state to a second data-processing state, wherein the transitioning of the first processor is based on a predetermined first pattern being detected by the first processor in the data conveyed by the first signal, and wherein the predetermined first pattern is learned by the first processor based on a second signal that is generated in response to having monitored the first physical condition prior to the first time interval, and
      ii) generating a third signal, wherein the third signal is based on the transitioning of the first processor to the second data-processing state; and
   a second processor for receiving the third signal from the first processor and for processing at least a portion of the data conveyed by the first signal, according to a first power mode indicated by the third signal received from the first processor;
   wherein the first processor is also for generating the first pattern, wherein the first processor generates the first pattern before processing the first signal, wherein the first pattern is based on the second signal, and wherein the second signal is based on the monitoring of the first physical condition.

2. The apparatus of claim 1 wherein the third signal is also based on the transitioning of the first processor from the first data-processing state.

3. The apparatus of claim 1 further comprising a network transceiver for transmitting data conveyed by a fourth signal to a user, wherein the fourth signal is based on the processing by the second processor.

4. The apparatus of claim 3 wherein the network transceiver comprises circuitry that transmits the fourth signal occurs only when the second processor is in the first power mode.

5. The apparatus of claim 1 further comprising a second sensor for monitoring a second physical condition, resulting in data conveyed by a fourth signal, wherein the first processor is also for processing the data conveyed by the fourth signal.

6. The apparatus of claim 5 wherein the transitioning of the first processor is also based on a predetermined second pattern being detected by the first processor in the data conveyed by the fourth signal.

7. The apparatus of claim 1 wherein the first processor is also for processing data conveyed by a fourth signal, resulting in the first processor transitioning to a third data-processing state, and wherein the transitioning of the first processor to the third data-processing state is based on a predetermined second pattern being detected by the first processor in the data conveyed by the fourth signal; and
wherein the first processor is also for generating a fifth signal, wherein the fifth signal is based on the transitioning of the first processor to the third data-processing state; and
wherein the second processor is also for processing at least a portion of the data conveyed by the fourth signal, according to a second power mode that is based on the fifth signal.

8. The apparatus of claim 1 wherein transitioning from the first data-processing state to the second data-processing state is based at least in part on the classifying of the data into the first voltage range.

9. The apparatus of claim 1 wherein the first power mode is characterized by a first combination of processing resources to be utilized by the second processor in processing the at least a portion of the data.

10. A method comprising:
producing, by a first sensor, a continuous analog signal while monitoring a first physical condition during a first time interval, wherein the continuous analog signal is digitized to produce a first signal having data that is indicative of the first physical condition, and wherein the data is classified into a first voltage range among a plurality of voltage ranges;
processing the data conveyed by the first signal, by a first processor, resulting in the first processor transitioning from a first data-processing state to a second data-processing state, wherein the transitioning of the first processor is based on a predetermined first pattern being detected by the first processor in the data conveyed by the first signal, and wherein the predetermined first pattern is learned by the first processor based on a second signal that is generated in response to having monitored the first physical condition prior to the first time interval;
generating a third signal, by the first processor, wherein the third signal is based on the transitioning of the first processor to the second data-processing state;
transmitting, by the first processor, the third signal;
receiving, by a second processor, the third signal generated by the first processor; and
processing, by the second processor, at least a portion of the data conveyed by the first signal, according to a first power mode indicated by the third signal;
wherein the first pattern is generated by the first processor before processing the first signal, wherein the first pattern is based on the second signal, and wherein the second signal is based on the monitoring of the first physical condition.

11. The method of claim 10 wherein the third signal is also based on the transitioning of the first processor from the first data-processing state.

12. The method of claim 10 further comprising transmitting data conveyed by a fourth signal to a user, wherein the fourth signal is based on the processing by the second processor.

13. The method of claim 12 wherein the transmitting of the fourth signal occurs only when the second processor is in the first power mode.

14. The method of claim 10 further comprising:
monitoring a second physical condition, by a second sensor, resulting in data conveyed by a fourth signal; and
processing, by the first processor, the data conveyed by the fourth signal.

15. The method of claim 14 wherein the transitioning of the first processor is also based on a predetermined second pattern being detected by the first processor in the data conveyed by the fourth signal.

16. The method of claim 10 further comprising:
processing data conveyed by a fourth signal, by the first processor, resulting in the first processor transitioning to a third data-processing state, and wherein the transitioning of the first processor is based on a predetermined second pattern being detected by the first processor in the data conveyed by the fourth signal;
generating a fifth signal, by the first processor, wherein the fifth signal is based on the transitioning of the first processor to the third data-processing state; and
processing, by the second processor, at least a portion of the data conveyed by the fourth signal, according to a second power mode that is based on the fifth signal.

17. The method of claim 10 wherein transitioning from the first data-processing state to the second data-processing state is based at least in part on the classifying of the data into the first voltage range.

18. The method of claim 10 wherein the first power mode is characterized by a first combination of processing resources to be utilized by the second processor in processing the at least a portion of the data.

19. A non-transitory computer-readable medium storing a control program executable by a mobile station, the program comprising instructions that cause a first processor of the mobile station to perform the steps of:
producing a continuous analog signal while monitoring a first physical condition during a first time interval, wherein the continuous analog signal is digitized to produce a first signal having data that is indicative of the first physical condition, and wherein the data is classified into a first voltage range among a plurality of voltage ranges;
processing the data conveyed by the first signal, resulting in the first processor transitioning from a first data-processing state to a second data-processing state, wherein the transitioning of the first processor is based on a predetermined first pattern being detected by the first processor in the data conveyed by the first signal, and wherein the predetermined first pattern is learned by the first processor based on a second signal that is generated in response to having monitored the first physical condition prior to the first time interval;
generating a third signal, wherein the third signal is based on the transitioning of the first processor to the second data-processing state; and transmitting the third signal to a second processor such that the second processor is directed to process at least a portion of the data conveyed by the first signal, according to a first power mode indicated by the third signal;

wherein the first pattern is generated by the first processor before processing the first signal, wherein the first pattern is based on the second signal, and wherein the second signal is based on the monitoring of the first physical condition.

20. The non-transitory computer-readable medium of claim 19 wherein the third signal is also based on the transitioning of the first processor from the first data-processing state.

\* \* \* \* \*